United States Patent

[11] 3,593,585

| [72] | Inventor | Eugene J. M. Bresson<br>Longjumeau, France |
|---|---|---|
| [21] | Appl. No. | 816,254 |
| [22] | Filed | Apr. 15, 1969 |
| [45] | Patented | July 20, 1971 |
| [73] | Assignee | Compagnie Generale D'Electricite<br>Paris, France |
| [32] | Priority | Apr. 17, 1968 |
| [33] | | France |
| [31] | | 428425 |

[54] MEASUREMENT OF THE DENSITY OF A FLUID
4 Claims, 2 Drawing Figs.
[52] U.S. Cl. ................................................ 73/453
[51] Int. Cl. ................................................ G01n 9/08
[50] Field of Search............................... 73/30, 32,
440, 444—453, 207—210, 503; 346/31; 340/187,
195, 197; 318/18

[56] References Cited
UNITED STATES PATENTS
| 1,707,822 | 4/1929 | Stock | 73/30 |
| 3,040,585 | 6/1962 | Chatel | 73/453 |
| 3,131,564 | 5/1964 | Romberg | 73/503 |
| 3,355,952 | 12/1967 | Romberg | 73/503 |
| 3,358,200 | 12/1967 | Clifford | 318/18 |
| 3,407,666 | 10/1968 | Glassey | 73/452 |

Primary Examiner—Richard C. Queisser
Assistant Examiner—C. E. Snee, III
Attorney—Sughrue, Rothwell, Mion, Zinn & MacPeak ABSTRACT: A float fitted with a magnet is immersed in the liquid whose density is to be measured. A generator sends a ramp current periodically to a main coil, thus causing a progressively increasing attraction towards the bottom of the float. At the moment the float sinks suddenly, a moment depending on the density of the liquid, the sudden movement is detected by a second coil which sets a flip-flop. At this time the intensity which caused this drop is recorded in a buffer storage unit. This information is subsequently stored, during the interval between two readings, in a second storage unit which controls the data indication units in a quasi-continuous manner.

MEASUREMENT OF THE DENSITY OF A FLUID

BACKGROUND OF THE INVENTION

1. Field of the Invention

The present invention relates to the measurement of the density of a fluid by immersing a float of known weight and volume in this fluid and determining the vertical force which is exerted on this float. This force is the difference between the upwardly directed Archimedes buoyancy force and the downwardly directed weight.

2. Description of the Prior Art

It is obvious that such a float permits the measurement of the mean density of the fluid surrounding it, which fluid may be a homogeneous liquid, and also equally well the combination of a gas and a liquid. In this latter case, and if the gas and the liquid, of known densities, are separated by a horizontal interface, the measurement of the mean density becomes a measurement of level.

For measurements of this type, it is known to balance the vertical force being exerted on such a float, generally in an upward direction, by a force of magnetic attraction. This latter force results from the action, on a magnetic element carried by the float, of a fixed coil (which will here be called the main coil) disposed on the vertical of this float and through which flows an electric current, of which the intensity is connected to the exerted force of attraction.

The measurement of this intensity thus forms a measurement of the density of the fluid, provided that the apparatus is suitably calibrated.

It is also known in such apparatus to associate one or more detecting coils with the aforesaid main coil, said associated coils permitting the displacements of the float to be registered and also functioning by electromagnetic interaction. Such detecting coils avoid the direct observation of the movements of the float and enable the density measurement to be made automatically.

More specifically, the known detecting coils have the purpose of controlling the position of the float: when this latter is moved from its normal position, an electric error signal appears in these coils. It is then amplified and acts on the strength of the current circulating in the main coil, this action taking place in the direction suitable for bringing the float back to its normal position.

Such a system, comprising a control loop, is relatively delicate and costly.

SUMMARY OF THE INVENTION

The object of the present invention is to overcome these disadvantages. It is concerned with a measuring arrangement for the density of a fluid. This arrangement comprises a movable part or float immersed in the said fluid. It is understood that the word "float" is used here in a general sense, i.e. it can indicate a movable element of which the mean density is higher than that of the fluid in which it is immersed. This float is fitted with a magnetic component interacting with a fixed main coil which is able, when an electric current of suitable strength, referred to as balancing strength, is flowing through it, to compensate for the vertical force being exerted on the said float because of its own weight and the Archimedes buoyancy. This magnetic element can on the other hand interact with a fixed detecting coil suitable for detecting the movements of this float. The arrangement also comprises means for measuring and recording the strength of the current flowing in the said main coil. It is characterized in that it is equipped with a "ramp generator" capable of causing the strength, referred to as the main strength, of the current flowing through the said main coil to vary between two values on either side of the said balancing strength, the said detecting coil being capable of supplying a "display" signal with the sudden displacement of the said float resulting from the passage of the value of the said variable main strength through the said balancing strength, the said display means being capable of constantly displaying the value of the said main strength measured at the instant of the said display signal.

The aforesaid magnetic element can be a permanent magnet.

The aforesaid display signal advantageously controls an electronic flip-flop, causing it to pass from a first state to a second state.

The aforesaid flip-flop advantageously controls two switches, the first being closed and the second being open when the said flip-flop is in its first state, and conversely, when the said flip-flop is in its second state. The said first switch connects a first memory to a member for measuring the aforesaid main current strength, so that the value recorded in this first memory is at any instant the measured value of this main current strength, while this first switch is closed. The said second switch connects the said first memory to a second memory, so that when it is closed, this second memory records the value registered in this first memory, the value registered in the said first memory being constant when the said first switch is open, as is that registered in the said second memory when the said second switch is open, the aforesaid display means being connected to the said second memory.

BRIEF DESCRIPTION OF THE DRAWING

One embodiment of the invention, given simply by way of illustration and without having any limiting features, will now be described by reference to the accompanying FIGS. 1 and 2. The elements shown in these figures bear the same reference numerals.

DESCRIPTION OF THE PREFERRED EMBODIMENT

Figure 1:
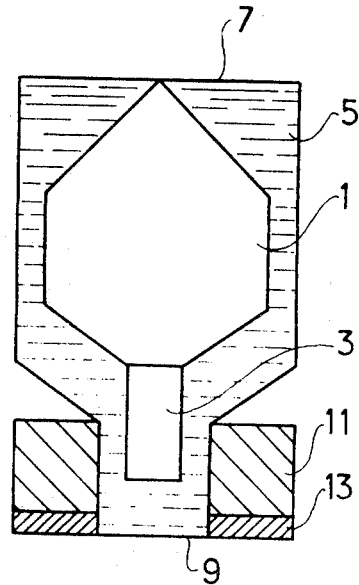
FIG. 1 represents a diagrammatic section of the arrangement according to the invention.

A float 1 of a shape designed to facilitate its vertical displacements can be seen in FIG. 1, and the weight and volume of this float are exactly determined. It comprises a permanent magnet 3 made of ferrite at its base. It is completely immersed in the liquid 5 of which the density is to be measured and which is contained in the vessel 7. The mean density of the float is lower than that of the liquid. The upper wall of the vessel or chamber 7 comprises at its center means (not shown) which cooperate with the upper end of the float 1 so as to prevent this end from being displaced horizontally when it abuts against the said wall, so that the position of this float is then well established. The chamber 7 is extended downwardly by a well 9, into which the magnet 3 can extend when the float 1 is displaced downwardly. This well 9 is enclosed by a main coil 11 and a detecting coil 13. The main coil 11, when an electric current is flowing therethrough, exerts an attracting force on the magnet 3. The float 1 is thus exposed to the effect of three vertical forces: its weight, the Archimedes buoyancy and the force of magnetic attraction. The knowledge of this latter force enables the density of the liquid to be determined, provided of course that the positions of the float 1 and the magnet 3 are well established, that these elements are not subjected to any other force, that is to say, particularly that the pressure exerted by the upper end of the float 1 coming into contact with the upper wall of the chamber 7 is cancelled out and that the acceleration and the speed of this float are negligible.

These last conditions will be satisfied at the instant when an increasing force of attraction exerted by the main coil 11 will cause the end of the float 1 to separate from the upper wall of the chamber 7.

For this purpose, the main coil 11 is traversed by a current gradient, i.e. by an electric current of which the strength increases linearly, thus setting up an attractive force which increases progressively. When this force has become sufficient, the float 1 is suddenly drawn downwardly, because its position is then unstable, the attractive force exerted by the main coil 11 on the magnet 3 being greater as this magnet is closer to the said coil as it descends into the well 9. The sudden displacement of this magnet 3 induces an electromotive force in the detecting coil 13. It is when the corresponding signal (display signal) appears that the main current strength (i.e. that which is flowing through the coil 11) has to be read. The aforementioned current slope is produced periodically and the measurement is thus also periodic, and the memorizing between two readings of the measured value makes it possible to have quasi-permanent information.

Because of the inertia of the float 1, it is difficult to make two readings spaced apart by less than 5 seconds.

Figure 2:
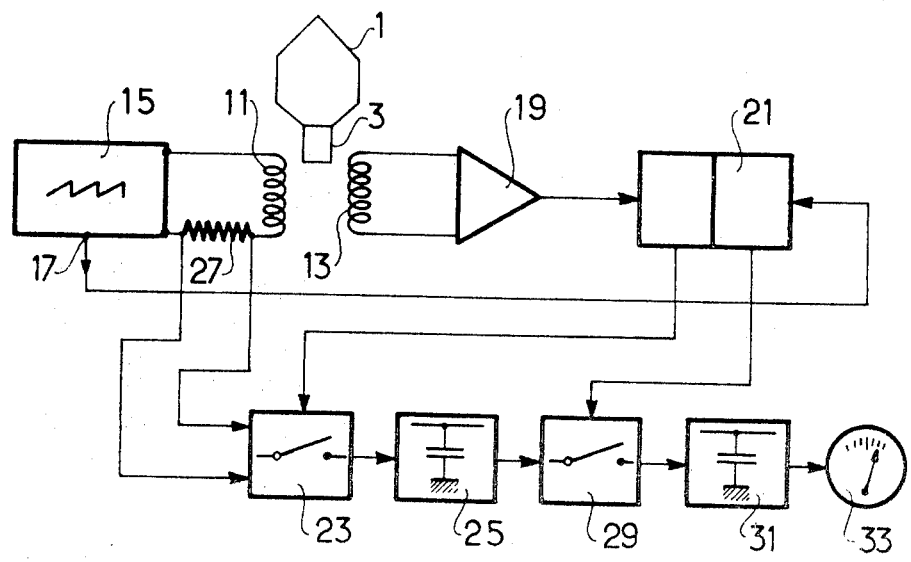
FIG. 2 represents a block diagram showing the electrical connections of the same arrangement.

The electrical functioning of the arrangement according to the invention will now be described by reference to FIG. 2, in which is to be seen, as well as certain members already referred to, the ramp generator 15 which supplies a periodic sawtooth current to the coil 11 and, on another output terminal 17, a simultaneous periodic reset signal synchronized with the vertical part of the saw tooth. The signal supplied by the detecting coil 13 is amplified at 19 and causes a bistable electronic flip-flop 21 to pass from its first state to its second state, this flip-flop subsequently returning to its first state under the action of the reset signal emitted from the generator 15.

When the flip-flop is in its first state, it holds a first switch 23 closed, this switch connecting a measuring member of the main current strength passing through the coil 11 to a first memory 25. This first memory can, for example, be a capacitance or an amplifier-integrator or a numerical memory. The member for measuring the main current strength can be simply a resistance 27 in series with the coil 11.

With the descent of the float 1, the electromotive force induced in the detecting coil 13, i.e. the display signal, causes the change of state of the flip-flop 21. The switch 23 is then opened and the value recorded in the memory 25, which value until then had followed the linear increase of the main current strength, becomes invariable.

Furthermore, a second switch 29 is controlled by the flip-flop 21. It is only closed when the said flip-flop is in its second state. This second switch 29 then connects the first memory 25, the content of which has become invariable, to a second memory 31, which registers the content of the said first memory.

When the reset signal appears at the end of the main current slope, the second switch 29 is opened and the second memory 31 preserves the information which it has recorded until the following measurement. This information can be read on a display member 33 or recorded, this being done in a substantially continuous manner despite the discontinuous character of the measurement. It is obvious that the characteristics of the measuring resistance 27, of the first memory 25 and of the second memory 31 are chosen so that the said first memory returns to zero at the commencement of the current slope and is uninfluenced by this second memory during the terminal portion of this slope.

I claim:

1. Apparatus for measuring the density of a fluid consisting of:
   a. a vessel containing said fluid;
   b. a float immersed in said fluid inside said vessel comprising abutting means in order to limit displacement of said float between a reference position and an extreme position therefrom, said float comprising a magnetic element;
   c. a fixed main coil for producing a magnetic field for interaction with said magnetic element, the magnetic force resulting from said interaction at said reference position of said float being vertical and such when said main coil is traversed by an electric current of suitable strength, known as the balancing value, the vertical force acting on said float because of its weight and the Archimedes buoyancy is compensated, said reference position being such that, for any given position change there is produced a magnetic force change which helps to increase this displacement;
   d. a ramp generator for energizing said main coil with a main current which varies according to a predetermined function of time, from a first to a second predetermined value on either side of the balancing current strength, this first value permitting said float to remain in said reference position;
   e. a detector member for detecting displacements of said float, said detector member producing a display signal resulting from any sudden displacement of said float from said reference position to said extreme position, with displacement occurring at the instant when the value of the electric current from said ramp generator passes through the balancing value;
   f. means for measuring the current strength circulating in the said main coil; and
   g. a display device controlled by said display signal to constantly display the value of the main current circulating in said main coil at the time said display signal is produced.

2. Apparatus according to claim 1 wherein said ramp generator includes means to produce a main current varying periodically between said first and second values.

3. Apparatus according to claim 1 further comprising:
   a. an electronic flip-flop controlled by said display signal, said display signal causing said flip-flop to change from a first state to a second state,
   b. first and second switches controlled by said flip-flop, said first switch being closed and said second switch being open when the said flip-flop is in its first state, and said first switch being open and said second switch being closed when the said flip-flop is in its second state,
   c. a first memory connected to said main coil by said first switch for measuring the aforesaid main current so that the value recorded in said first memory is at any instant the measured value of the main current strength while said first switch is closed, and
   d. a second memory connected to said first memory by said second switch so that when said second switch is closed said second memory records the value recorded in said first memory, said value remaining constant when said first switch is open as is that recorded in said second memory when the second switch is open, the aforesaid display device being connected to said second memory.

4. Apparatus according to claim 3 further comprising means for periodically resetting said flip-flop from its second state to its first state thereby permitting the periodic measurement of the density of the said fluid.